March 1, 1966  D. M. WIGHT, JR  3,237,894
APPARATUS FOR THE PREVENTION OF THE EXPLOSION OF FUEL TANKS
Filed Nov. 8, 1963
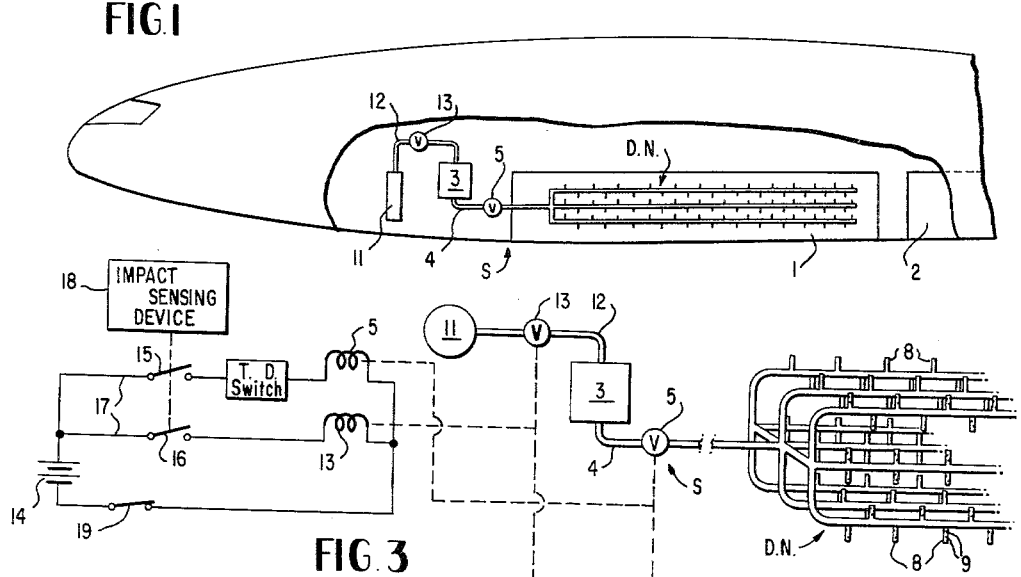
FIG.1
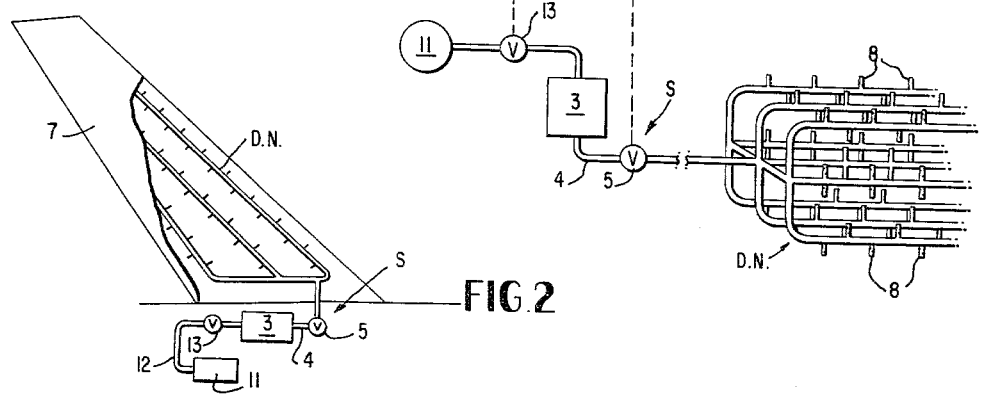
FIG.3
FIG.2
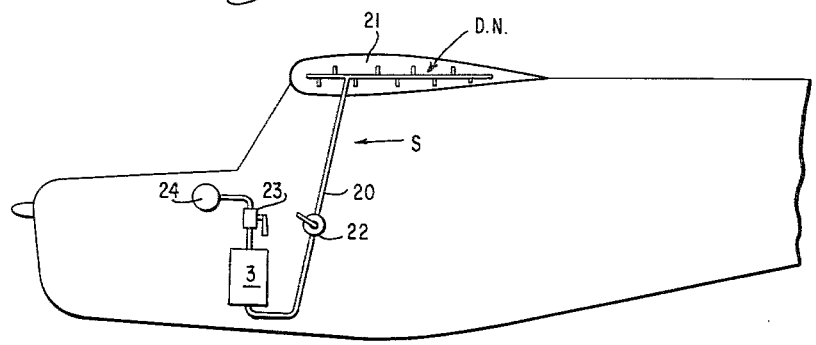
FIG.4
INVENTOR.
DONALD M. WIGHT, JR.
BY Baldwin & Wight
ATTORNEYS

United States Patent Office 3,237,894
Patented Mar. 1, 1966

3,237,894
APPARATUS FOR THE PREVENTION OF THE EXPLOSION OF FUEL TANKS
Donald M. Wight, Jr., Arlington, Va.
(3414 Porter St. NW., Washington, D.C. 20008)
Filed Nov. 8, 1963, Ser. No. 322,316
4 Claims. (Cl. 244—129)

This invention relates to safety devices for engine driven vehicles and more specifically to a device which introduces a fire or explosion inhibitor into aircraft fuel in an aircraft when a crash is imminent or actually in the first stage of happening.

Statistics have shown that an alarming number of human injuries and deaths resulting from aircraft crashes with the ground are attributable to fire or the rapid burning or exploding of the aircraft fuel. When a plane which is crashing or crash landing ploughs into the ground usually the fuel tanks rupture and the fuel flowing out of the rupture mixes with the wind passing by the rupture and forms vapor or fuel mist. This wind may be the relative flow of air over the aircraft or when the aircraft is skidding or skipping across the ground or it may be the result of turbulence in the air set up by the crash. This vapor or fuel mist is extremely inflammable and may be easily ignited by a stray spark or hot wire or the friction resulting from the crash. When ignited, this vapor burns or explodes much more violently and with a far hotter fire than the liquid fuel itself because of the presence of oxygen in the mixture. The violent explosion resulting from the ignition of this vapor may crush or rupture the cabin walls of the aircraft or send objects flying through the air in the cabin thereby increasing the crash hazard to the passengers and crew. The hazard from the explosion of the vapor itself, however, is one of the most serious causes of injury to personnel.

It is an object of this invention to provide a means whereby upon activation of a crash system in an aircraft or other engine driven vehicle a chemical which will cause aircraft or vehicle fuel to gel instantly is introduced into the fuel tanks to cause the fuel to gel thereby preventing or greatly reducing the vaporizing effect of the fuel from a ruptured fuel tank during a crash.

Another object of this invention is to provide a means whereby a gelling chemical is introduced to the aircraft fuel automatically upon the initial crash impact.

Still another object of this invention is to provide a means whereby the pilot of an aircraft may activate a fuel gelling system when a crash is imminent or just before touchdown when making a no-wheel or emergency landing.

Another object of this invention is to provide a gelling system for an aircraft fuel tank system which will introduce a gelling chemical throughout all the fuel in the aircraft tank system almost instantly upon activation of the gelling system and whereby the gelling chemical almost instantly reaches all the fuel without the need for separate mixing or stirring devices.

Such a gelling compound as that commonly known as Napalm could be used. Upon mixing Napalm mixture with gasoline, gelled gasoline is formed. Other faster acting chemicals are under development. Such faster action chemicals will cause fuel to gel within 1 or 2 seconds after the mixing takes place.

Although reference is made here primarily to aircraft use, the invention could also be used in tanker ships, gasoline tank trucks and the like.

Other objects will become apparent from a reading of the following description, the appended claims and the accompanying drawing, in which:

FIGURE 1 is a fragmentary side elevational view showing a jet aircraft embodying the invention in a fuselage fuel tank;

FIGURE 2 is a fragmentary plan view of an aircraft wing fuel cell embodying the invention;

FIGURE 3 is a schematic view showing in part the distribution network system of the invention and an electrical circuit for operating the invention; and FIGURE 4 is an alternative form of the invention adapted for light aircraft installation.

Referring to FIGURE 1, the forward fuel cell 1 and aft fuel cell 2 each has associated therewith a system S comprising a gelling chemical container or canister 3 for containing the gelling chemical, tubing 4, a valve 5 and a distribution network DN. The tubing 4 provides conduit means which connects the container 3 through the valve 5 to the distribution network DN. FIGURE 3 shows the structure in more detail. The tank 3 has a pressurizing conduit means provided by a tube 12 through which pressure in the tank 3 may be built up to force the gelling chemical through the distribution network DN when valve 5 is opened. The compressed gas bottle 11 is connected by tubing 12 to the tank 3. Valve 13 is disposed in the tube 12 to control the pressure in tank 3. There may, of course, be a plurality of individual systems S for each fuel cell. Such a multiple system installation would, of course, increase the reliability of the installation, one system backing up another.

In FIGURE 2, a system is shown in a wing cell or "wet wing" 7.

The distribution network DN comprises piping and a plurality of nozzles 8 through which the gelling chemical may be forced into immediate chemical mixing relationship with all the liquid fuel. Each nozzle 8 has a number of outlet orifices 9 which direct the outflow of the chemical. Each distribution network DN has nozzles 8 dispersed throughout the fuel tank at mutually spaced locations below the surface of fuel in the tank so that no increment volume of fuel in the tank is at any time so far from a nozzle 8 that it will not be instantly mixed with gelling chemical when the system is operated. The outflow of the chemical from the orifices 9 in a swirling fashion under high pressure from the compressed gas bottle 11 is distributed throughout substantially the entire body of fuel in the tank or at least a major part of the body of fuel, and causes an instantaneous stirring, momentary circulation and mixing of the chemical and fuel in the vicinities of the respective nozzles 8. This momentary circulation and mixing is enough to cause the chemical to adequately mix with all the fuel in the fuel cell or tank before the fuel begins to gell thereby causing all the fuel to gell. Without such instantaneous intimate contact of the gelling chemical with the liquid fuel, pockets of liquid fuel could be caused in the gelled fuel.

In FIGURE 3, the system is shown with an electric activation means. The electrical source 14 is connected through switches 15 and 16 by conductor 17 to electric valves 13 and 5. When switches 15 and 16 are closed the circuit to the electrically operated compressed gas bottle valve 13 is completed thereby causing the valve 13 to open, and allowing the compressed gas in the compressed gas bottle 11 to pressurize the gelling chemical canister or container 3. The circuit to the tank valve 5 is also completed but through a momentary time delay device TD; upon the operation of the time delay device TD the circuit is completed to the tank valve 5 which operates similarly to the gas bottle valve 13. The time delay feature allows the gelling chemical tank 3 to become fully pressurized before the chemical is released through the distribution network DN to the fuel in the fule tank. This assures a positive, quick instantaneous surge under high pressure of the gelling chemical into the fuel.

Both switches 15 and 16 may be actuated by the pilot of the aircraft or they may be actuated by an impact sensing device 18. This impact sensing device would actuate the switches 15 and 16 only when it detects a shock which could result only from contact of the aircraft with the ground or water. The impact sensing device is not sensitive to the usual air turbulence or rough air. A disabling switch 19 is placed in the circuit to disable the system if for any reason the pilot so desires. It is to be understood that the actuation of the switches 15 and 16 ordinarily opens all the tank valves 5 and all the air bottle valves 13 in all the fuel cells. However, if the pilot so desires he could select from the cockpit of the aircraft only one or certain systems S and thereby gel only the fuel in one or selected fuel tanks or cells. This selective gelling procedure would be of value if one fuel tank or cell developed a severe leak which raised the possibility of fire. Such selective gelling could be electrically controlled from a fuel gelling control panel in the aircraft. The leak could be stopped immediately by gelling the fuel in the particular fuel cell.

An alternative embodiment of the invention is shown in FIGURE 4. The system here is adapted to be manually operated. The system comprises a container or canister 3 for containing the gelling chemical. A line 20 connects the tank 3 to the distribution network DN in the fuel tank 21. A valve 22 is disposed in the line 20 and is manually operable from the cockpit of the aircraft. A compressed gas cartridge 24 is connected with the tank 3 through a valve 23. When the valve 23 is actuated from the cockpit the compressed gas flows into the tank 3 and pressurizes it. Manual actuation of the valve 22 then allows the compressed gas to force the gelling chemical rapidly through the tube 20 to the distribution network DN and into the fuel.

USE

When the pilot of an aircraft equipped with this device sees that a crash is imminent, he puts the systems into play just prior to impact by actuating switches 15 and 16. These electrical switches 15 and 16 may be operated by a single CRASH button which is readily accessible to the pilot or by the impact sensing device 18. Upon completion of the circuit, the air bottle valve 13 is opened allowing air pressure from the compressed gas bottle 11 to pressurize the gelling chemical tank 3. At the same time the time delay switch TD is activated and upon completion of its delay cycle the tank valve 5 opens thereby allowing the gelling chemical which is in the tank 3, now pressurized, to be forced rapidly through the distribution network DN and into close mixing relationship with all the liquid fuel in the fuel tanks or cells thereby causing the fuel to gel.

When an aircraft crashes belly first which is frequently the case as in a semi-controlled crash, there are known to be two distinct thuds or impacts. Generally the first thud or impact is a skip and the aircraft bounces momentarily back into the air; the second impact is the crash itself. If the pilot had failed to bring the gelling system into play before the first impact, the impact sensing device 18 in the system would automatically activate the gelling system; by the second impact or thud, the fuel would be substantially gelled.

The constructions shown and described embody the invention in preferred forms, but it is intended that the disclosure be illustrative rather than definitive, the invention being defined in the claims.

I claim:

1. In an engine driven vehicle having a tank for liquid fuel, a distribution network within said tank providing a plurality of outlets spaced from one another and dispersed throughout at least the major part of the interior of the tank and being adapted to dispense a fluid into fuel throughout substantially the entire body of fuel substantially instantaneously; a container for containing a fuel gelling chemical; gelling chemical conduit means providing communication between said container and said network; and controlling means for effecting the flow of said gelling chemical from said container through said conduit means to said network and thence into the fuel in said tank at a plurality of points dispersed throughout said fuel.

2. A construction according to claim 1 including a gelling chemical valve interposed in the gelling chemical conduit means; means including a compressed gas bottle and a gas conduit means connecting said bottle to said container to cause a gelling chemical in said container to pass through said gelling chemical conduit means and through the distribution network; and a compressed gas bottle valve interposed in the gas conduit means.

3. A device as claimed in claim 2 and including a time delay means for operating said air bottle valve before the gelling chemical valve is operated.

4. A device as claimed in claim 3 and including an impact sensing device for automatically operating the gas bottle valve and the gelling chemical valve when the vehicle crashes.

References Cited by the Examiner

UNITED STATES PATENTS

| | | | |
|---|---|---|---|
| 2,129,826 | 9/1938 | Dintilhac | 169—2 |
| 2,189,147 | 2/1940 | Mathisen | 169—2 |
| 2,301,483 | 11/1942 | Van Daam | 169—4 |
| 2,375,297 | 5/1945 | Freeman | 169—4 |
| 2,385,825 | 10/1945 | Mathisen | 169—2 |
| 2,566,235 | 8/1951 | Mathisen | 169—2 |
| 2,588,312 | 3/1952 | Walker | 169—4 |
| 2,751,284 | 6/1956 | Hill et al. | 44—7 |
| 3,097,622 | 7/1963 | Bell | 114—125 |
| 3,174,550 | 3/1965 | Bugg | 169—2 |

MILTON BUCHLER, *Primary Examiner.*

FERGUS S. MIDDLETON, *Examiner.*

D. P. NOON, B. BELKIN, *Assistant Examiners.*